Sept. 13, 1960 M. CORNELL 2,952,448
DEGASIFYING, BLENDING, MILLING AND HOMOGENIZING MACHINERY
Filed May 20, 1957 5 Sheets-Sheet 1
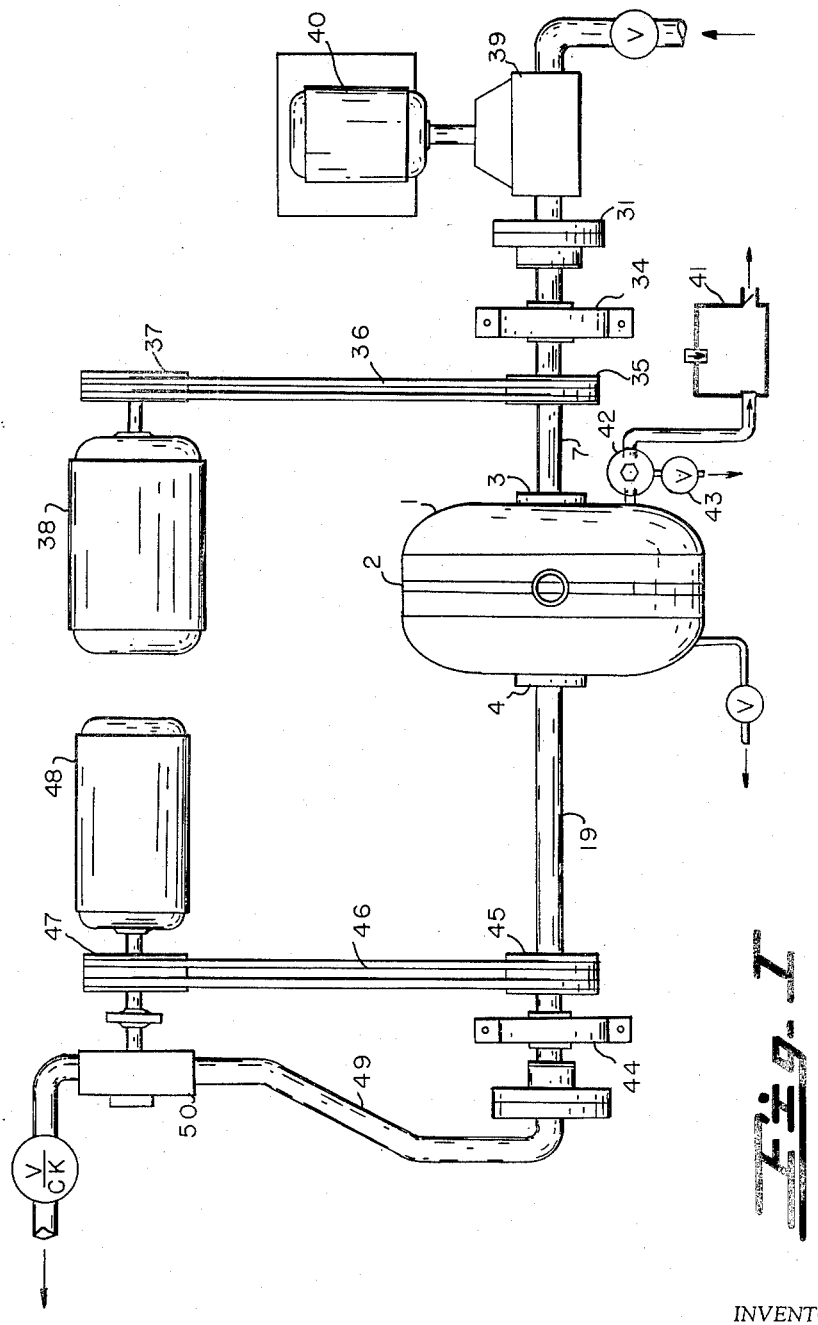
INVENTOR.
MEAD CORNELL
BY
Marshall, Marshall & Yeasting
ATTORNEYS Sept. 13, 1960 M. CORNELL 2,952,448
DEGASIFYING, BLENDING, MILLING AND HOMOGENIZING MACHINERY
Filed May 20, 1957 5 Sheets-Sheet 2
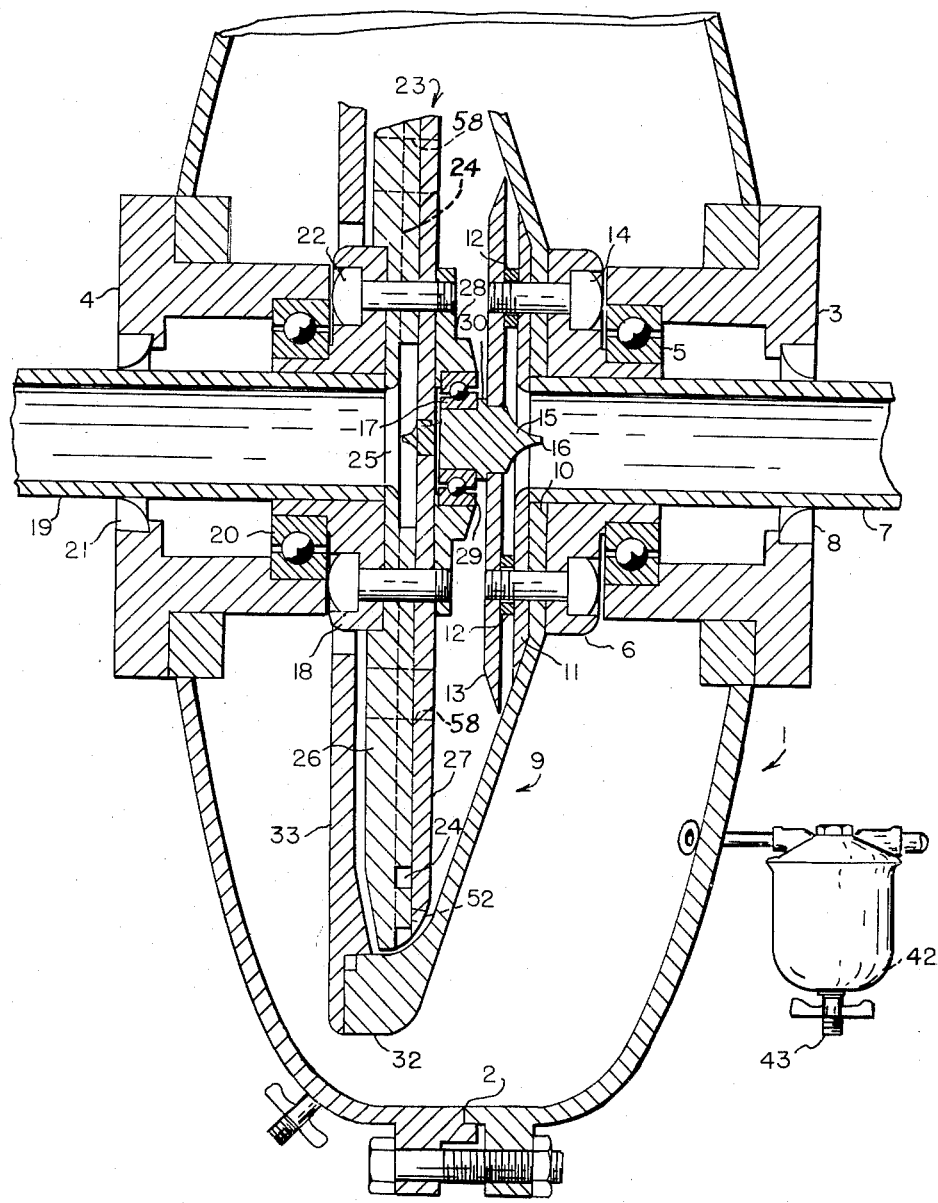
Fig. II
INVENTOR.
MEAD CORNELL
BY
Marshall, Marshall & Yeasting
ATTORNEYS

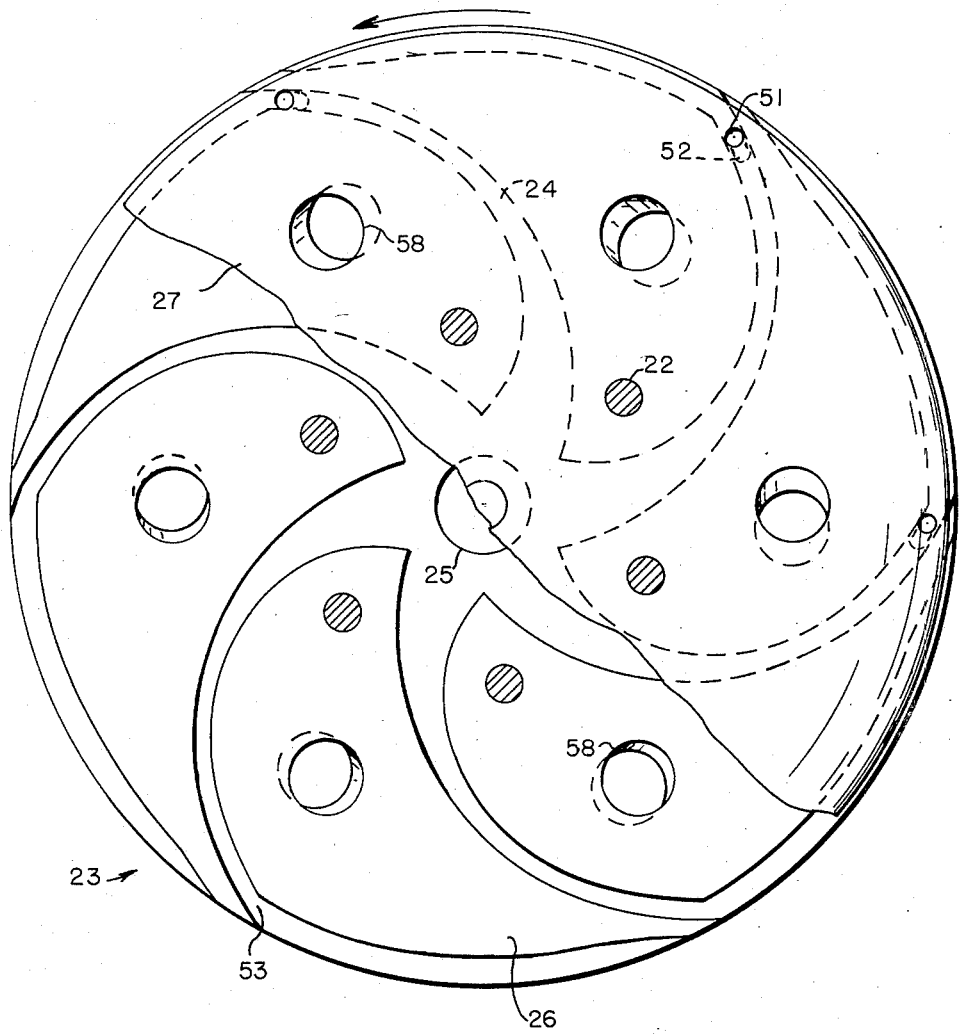

Sept. 13, 1960　　　　　M. CORNELL　　　　　2,952,448
DEGASIFYING, BLENDING, MILLING AND HOMOGENIZING MACHINERY
Filed May 20, 1957　　　　　　　　　　　　　　5 Sheets-Sheet 4
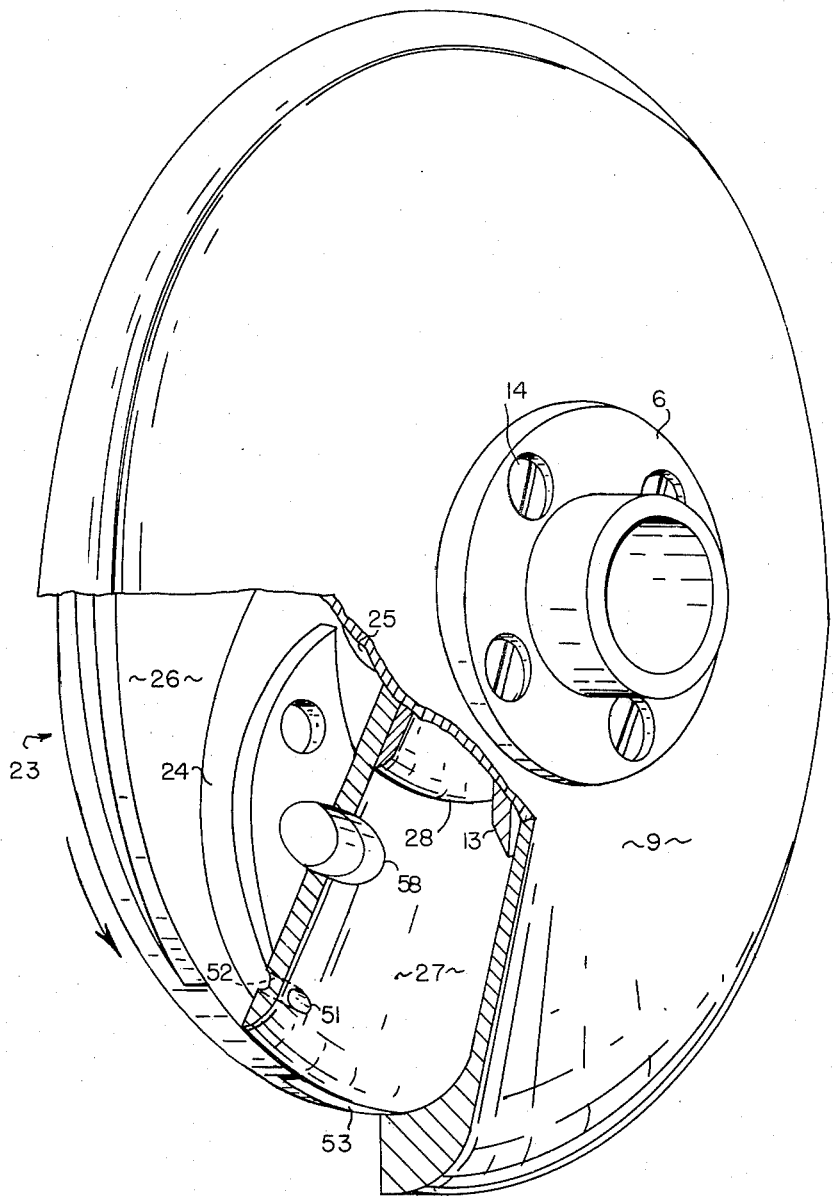
Fig. IV
INVENTOR.
MEAD CORNELL
BY
*Marshall, Marshall & Yeasting*
ATTORNEYS

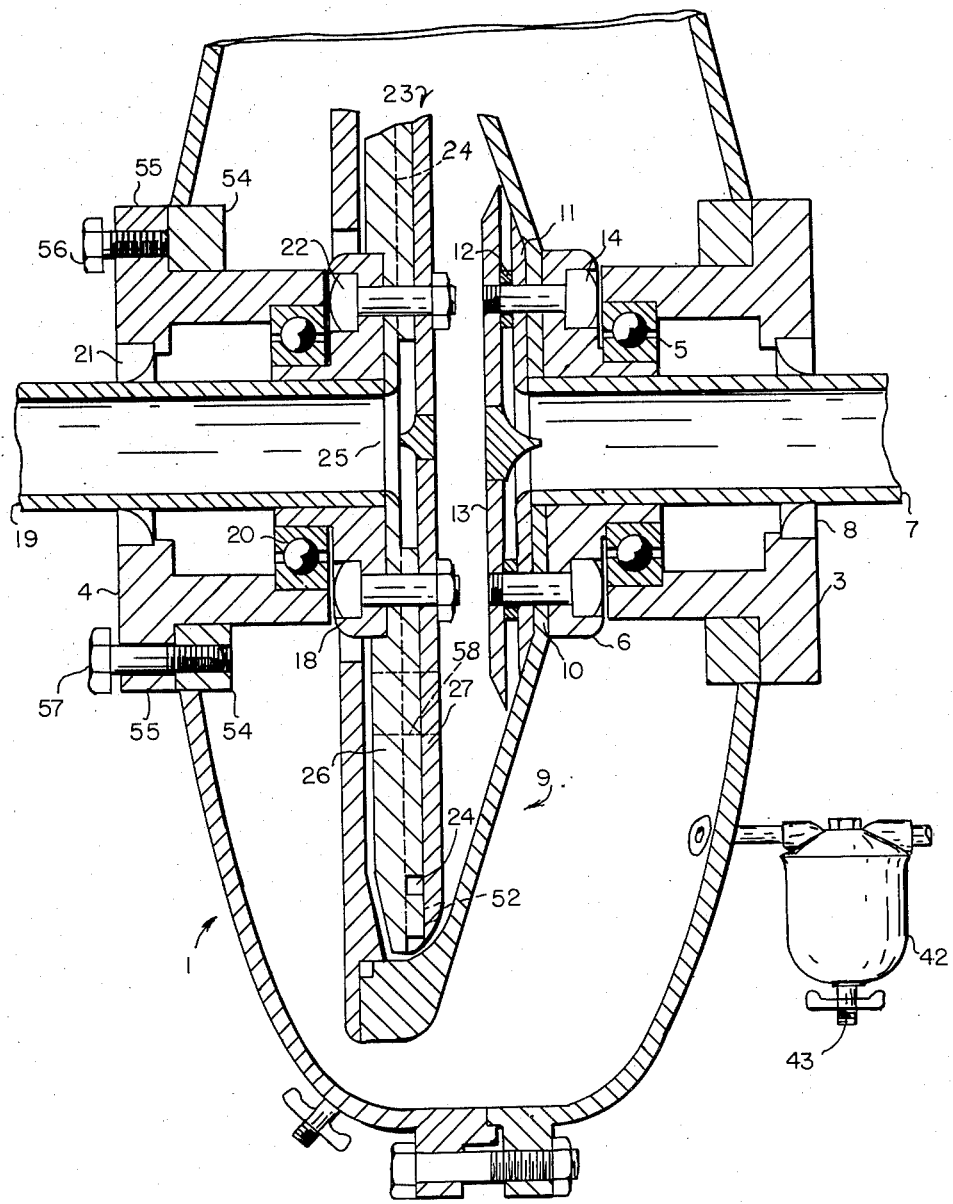
Fig. V

United States Patent Office 2,952,448
Patented Sept. 13, 1960

2,952,448

DEGASIFYING, BLENDING, MILLING AND HOMOGENIZING MACHINERY

Mead Cornell, San Francisco, Calif., assignor to Griffin, Cornell Company, San Francisco, Calif., a corporation of California Filed May 20, 1957, Ser. No. 660,266

10 Claims. (Cl. 259—9)

Many materials such as lubricants, paints, plastics, foods and great varieties of other compositions need to be physically refined in order to attain the highest degree of efficacy.

Many organic compounds are subject to spoilage or deterioration by oxidation or the action of aerobic agents. There are, of course, many processes in which aeration is advantageous, but there are also many processes in which the elimination of air and/or other gases or vapors is quite as important, and in which it is impracticable to employ heat to drive out the deleterious gaseous or vaporous contaminants.

The superiority of suspensions of fine particles, such as suspensions of pigments in liquids and colloidal suspensions, usually depends to a considerable extent upon the fineness, uniformity of size and uniformity of distribution of the solid or colloidal particles; the finer and more uniformly distributed the particles of pigment in a paint, for example, the better its covering characteristics and the longer it will keep in storage without "settling out."

Keeping qualities, utility in the culinary arts, and the flavor and healthful qualities of foodstuffs often also are enhanced by fine milling, thorough blending and homogenization.

The importance of thorough blending and homogenization in the preparation of mixtures of liquid components is well known.

It is an object of this invention to provide an improved machine for abstracting gases and vapors from materials being processed.

It is another object to provide such a machine which is also capable of micro-milling materials having components in the form of particles.

It is still another object to provide an improved machine such as that mentioned in the foregoing sentences which is further capable of thoroughly blending and homogenizing materials having soft or liquid components.

And it is a further and very important object to provide a machine which is capable of so processing many materials as to subject them to the particular combination of degasifying, milling, blending and/or homogenizing treatments that the materials require.

Other objects and many advantages of the invention will be apparent upon perusal of the following specification and examination of the accompanying drawings in which:

Fig. I is a somewhat schematic layout of a machine embodying this invention;

Fig. II is a sectional view through the principal processing unit of the machine, the upper part of the unit being broken away;

Fig. III is an elevational view of a gathering rotor which is one of the important elements of the machine, a part of a cover plate of the gathering rotor being broken away;

Fig. IV is a perspective view with parts broken away and parts in section, showing the relationship of the gathering rotor and a dispersing rotor which is another important element of the machine; and Fig. V is a fragmentary sectional view showing an alternative form of an adjusting device.

These drawings and the description that follows are to illustrate and describe a preferred form of the machine but are not intended to limit the scope of the invention.

The important processing elements of the machine are enclosed within an air tight capsule 1 (Figs. I and II). The capsule 1 preferably is an oblate spheroid in shape and preferably is divided along its equator 2 to facilitate assembly of mechanism therein.

The capsule 1 has journals 3 and 4 fitted at its poles. Rotatably mounted in the journal 3, by means of a ball bearing 5, is a hub 6 that is fixed by press fitting and welding or otherwise upon a hollow intake shaft 7, there being a pressure seal 8 surrounding the shaft 7 in an annular recess in the journal 3 to prevent air from seeping around the shaft 7 and thus entering the capsule 1. The inner end of the hollow intake shaft 7 protrudes slightly inwardly through the hub 6 and into a central opening in a circular dispersing rotor 9, which has a flat center portion indicated by the numeral 10. The flat center portion 10 of the rotor 9 overlies the inner end of the hub 6, and an annulus 11 overlies the flat center portion 10.

The portion of the circular dispersing rotor 9 which extends outwardly from the flat center portion 10 is frusto-conical in shape, and the edge of the annulus 11 is beveled to fit the frusto-conical shape of this portion of the rotor 9 without leaving a shoulder around the edge of the annulus.

Mounted parallel to the annulus 11 and spaced therefrom by means of shimming washers 12 or other spacing devices is a buttering ring 13. Pressed into the center of the buttering ring 13 is a flanged lug 15 having a pointed end 16 projecting axially into the hollow shaft 7. The body of the lug 15 projects from the other side of the buttering ring 13 and has pressed thereon a ball race 17, the assembly of hub, dispersing rotor, annulus, spacing washers and buttering ring being held together by means of a series of screws 14 threaded into the buttering ring 13. In the construction shown the assembly may be made before the hub 6 is mounted in the journal 3 and before the hemispheroidal sides of the capsule 1 are put together.

The buttering ring 13 has a knife edge around its periphery, and the thickness of the shimming washers 12 is adjusted so that the knife edge around the periphery of the buttering ring 13 lies in optimum proximity to the conical surface of the dispersing rotor 9. The best adjustment may vary with the viscosity and other characteristics of the material to be treated. The gap between the knife edge of the buttering ring and the conical inner surface of the dispersing rotor must be wide enough to permit non-deformable particles to pass through, but narrow enough to spread deformable material into a very thin layer. The knife edge of the buttering ring prevents the material from clinging to the periphery of the ring or curling or creeping over it as some materials would be liable to do if the edge were blunt.

The journal 4 may be identical or substantially identical with the journal 3. A hub 18 which is generally similar to the hub 6 is fixed by press fitting and welding or otherwise upon a hollow outlet shaft 19, the hub 18 being rotatably mounted by means of ball bearings 20 in the journal 4, and there being a pressure seal 21 lying within an annular recess in the journal 4 and surrounding the hollow outlet shaft 19 to prevent air from seeping around the shaft into the capsule 1.

Fixed by means of screws 22 to the hub 18 is a gathering rotor 23 having curved channels 24 (Fig. III) leading from its periphery to an opening 25 at its center, which opening registers with the open end of the hollow outlet shaft 19. The channels 24 are formed in the main body 26 of the gathering rotor 23 and are covered by a cover plate 27 which is secured upon the main body 26 by means of the screws 22 that fasten the gathering rotor upon the hub 18. These screws 22 are threaded into a bearing holder 28 which carries a ball bearing 29, the inner race 17 of which is pressed on the lug 15. This lug which, as mentioned above, is pressed into the buttering ring 13, has a flange 30 that spaces the buttering ring from the ball race 17. The thickness of the flange 30 determines the axial spacing between closely adjacent parts of the dispersing rotor 9 and the gathering rotor 23. This spacing can be adjusted by changing the lug, or otherwise.

In the form of device shown in the drawings, the rim 32 of the dispering rotor 9 extends around the periphery of the gathering rotor 23, the converging marginal areas forming therebetween a trough with sides which converge at a decreasing rate toward the peripheries of the rotors. A splash shield 33 is attached to the rim 32 to prevent accidental surges or splashes into the capsule 1 when the machine is being adjusted or started or stopped.

The radial clearance between the periphery of the main body 26 of the gathering rotor and the rim of the dispersing rotor may be of the order of .005", i.e. only sufficient to avoid rubbing contact between said rotors while the minimum axial clearance between the faces of the dispersing rotor and the gathering rotor may be from .02" to .06". The optimum axial clearance will vary with various materials and may be adjusted by changing the lug 15 or otherwise adjusting the axial spacing between the dispersing rotor and the gathering rotor.

The hollow intake shaft 7 extends outwardly through a journal block 34 (Fig. I) and carries a driven pulley 35 around which is looped belting 36 which takes around a driving pulley 37 on the shaft of a dispersing rotor driving motor 38. A twenty horsepower motor has proven to be sufficiently powerful to drive an eighteen inch dispersing rotor of a machine such as described in this specification at a speed of 2500 r.p.m. The power of the motor 38 preferably should, of course, be commensurate with the work to be done.

Material to be processed preferably is fed into the intake shaft 7 through a rotary joint 31 by means of a feed pump 39, which may be operated by a feed motor 40 through variable speed gearing (not shown). The rate of feed depends upon the nature of the material and the treatment required, whether merely degassing, or blending and homogenizing, or milling.

A partial vacuum preferably is maintained within the capsule 1 by a vacuum pump 41, and the line leading from the capsule 1 to the vacuum pump 41 may be equipped with a trap 42 to catch condensed moisture, which may be drained off by means of a valve 43. A drain valve also may be connected into the capsule 1 to remove any liquid that may be accidentally spilled therein.

The hollow outlet shaft 19 extends outwardly through a journal block 44 and carries a driven pulley 45 around which is looped belting 46 which takes around a driving pulley 47 on the shaft of a gathering rotor driving motor 48. A five horsepower motor has proven to be sufficiently powerful to drive the gathering rotor of this machine at a speed of 500 r.p.m. The power of the motor 48 preferably should be commensurate with the work to be done.

The hollow outlet shaft 19 leads into a conduit 49, which in turn leads to a discharge pump 50 having a capacity at least as great as the capacity of the feed pump 39. The discharge pump 50 may be operated by the motor 48 which rotates the hollow outlet shaft 19, or a separate motor may be used to drive the discharge pump. The discharge pump 50 should be a one-way type, or be equipped with a check valve beyond the pump to retain the vacuum in the pump, the conduit, the outlet shaft and the capsule when no product is being discharged.

The capsule, the journal blocks for the hollow shafts, and the motors for driving the hollow shafts preferably are all mounted on the same base or frame to constitute a complete machine. In the somewhat schematic layout of Fig. I the various units are arranged for clearness of illustration, but in an actual machine they may be arranged for compactness and convenience in operation.

The gathering rotor 23 is provided with a series of holes 58 which are so inclined that the rotation of the gathering rotor pumps gases and vapors through the holes 58 from the space between the rotors 9 and 23. When a column of pumpable material to be processed moves through the hollow inlet shaft 7 and encounters the pointed end 16 of the lug 15 it moves radially outwardly between the annulus 11 and the buttering ring 13. A thin layer of the material emerges through the gap between the knife edge of the buttering ring and the conical inner surface of the dispersing rotor 9. It is important that this conical surface be smooth and non-porous. When the machine is to be used for processing corrosive materials the rotor 9 may be spun of stainless steel and its inner surface may be polished.

Since the dispersing rotor is rotating at high speed, e.g. 2500 r.p.m., the thin layer of material is pressed by centrifugal force against the smooth conical inner surface of the dispersing rotor and such bubbles, if any, as the material may contain are flattended and broken by the pressure, and by the distortion which they undergo as the layer is stretched over more and more area during its outward movement. Even bubbles of microscopic size are thus destroyed as the layer is converted into a film, and as the film stretches and exposes molecules of absorbed gases to vacuum conditions even the absorbed gases are largely eliminated.

The same forces that destroy the bubbles also flatten and disperse any soft lumps that may have passed through the gap between the conical inner surface of the dispersing rotor and the knife edge of the buttering ring. Stiffer particles that are contained in the composition being processed are milled to superfineness when they reach the progressively narrowing space between the rim of the dispersing rotor and the periphery of the gathering rotor, which is rotating in the direction opposite to the direction of rotation of the dispersing rotor.

The cover plate 27 of the gathering rotor is provided with a series of orifices 51 in the rounded beveled surface of the cover plate which lies in close proximity to the similar portion of the inner surface of the oppositely spinning dispersing rotor 9. The orifices 51 are mouths of holes 52 which lead inwardly and rearwardly to the several curved channels 24, and as the orifices pass in quick succession around the outwardly advancing edge of the film of material being processed, each of them skims a strip of film from such outwardly advancing edge. The radially opening ends 53 of the channels 24 pick up such fragments of film as may be missed by the orifices 51. The material fed into the gathering rotor adjacent its periphery has tangential movement in the direction opposite to that in which the gathering rotor is turning, and the inertia of the moving material causes it to flow inwardly along the curved channels 24.

The relative speeds at which the dispersing rotor and the gathering rotor should turn to achieve the greatest output with economical consumption of power depend on many factors, such as the specific gravity, the viscosity and other characteristics of the material to be processed as well as the results desired. The speeds that are most useful can be readily ascertained empirically. In general the speed of the dispersing rotor should be much higher than the speed of the gathering rotor. The speed of the gathering rotor may range downwardly to zero.

It is useful to adjust the axial spacing between the dispersing rotor and the gathering rotor from time to time while the optimum spacing is being ascertained. In order to facilitate making such adjustment without disassembling any of the mechanism, an alternative form of adjusting device may be provided as shown in Fig. V. In this form a ring 54 is welded into an opening at the outlet pole of the capsule 1. The journal 4 is closely but slidably fitted into the ring 54 and has a flange 55 overlying the ring.

Passing through holes in the flange 55 and threaded into the ring 54 are three cap screws 56. Threaded through the flange 55 are three set screws 57, the cap screws and set screws being alternately equally spaced around the flange.

The thickness and position of the ring 54 are such that when the set screws 57 are backed out of engagment with the ring 54 and the cap screws 56 are screwed up tightly there will be a minimum axial clearance of .02" between the outer margins of the dispersing rotor 9 and the gathering rotor 23. By backing out the cap screws for a definite distance such as may be ascertained by means of a feeler gauge and then tightening the set screws against the ring, the axial clearance between the dispersing rotor and the gathering rotor can be adjusted as desired.

The machine of this invention possesses the virtue of having adaptability of functioning without change other than slight adjustment, to improve various products by any one or more needed treatments. If the product needs degasification the machine degasifies it. If the product needs homogenization the machine homogenizes it. If milling is needed the machine mills it. If a combination of treatments will improve the product it gets the combination of treatments.

It is to be understood that the particular form of machine hereinbefore described and illustrated by the accompanying drawings is exemplary only and that it is subject to modification within the spirit and scope of the subjoined claims.

I claim:

1. A machine for treating pumpable materials comprising, in combination, a dispersing rotor having a conical inner surface, means for delivering such a material to said conical inner surface, a gathering rotor having curved channels leading toward its axis of rotation, means for turning said dispersing rotor in one direction, means for turning said gathering rotor in the opposite direction, means whereby such material is transferred from a circular margin of said conical inner surface into said curved channels, and means for conducting such material out of said curved channels.

2. A machine for treating pumpable materials comprising, in combination, a dispersing rotor having a conical inner surface, means for delivering such a material to said conical inner surface, a buttering element for spreading such material upon said conical inner surface, a gathering rotor having curved channels leading toward its axis of rotation, means for turning said dispersing rotor in one direction, means for turning said gathering rotor in the opposite direction, means whereby such material is transferred from a circular margin of said conical inner surface into said curved channels, and means for conducting such material out of said curved channels.

3. A machine for treating pumpable materials comprising, in combination, a dispersing rotor having a conical inner surface, means for delivering such a material to said conical inner surface adjacent to the axis of rotation of said rotor, a buttering element having a knife edge for spreading such material upon said conical inner surface, a gathering rotor having curved channels leading toward its axis of rotation, means for turning said dispersing rotor in one direction, means for turning said gathering rotor in the opposite direction, means whereby said material is transferred from a circular margin of said conical inner surface into said curved channels, and means for conducting such material out of said curved channels.

4. A machine for treating pumpable materials comprising, in combination, a dispersing rotor having a conical inner surface generated about the axis of rotation of said dispersing rotor, means for delivering such a material to said conical inner surface adjacent said axis, a buttering element having a circular knife edge concentric with said axis for spreading such material upon said conical inner surface, there being a narrow circular crack between said circular knife edge and said conical inner surface, whereby such material emerging through said narrow crack is spread upon said conical inner surface in a thin layer, means for revolving said dispersing rotor rapidly about its axis, whereby said material is formed by a centrifugal action into an outwardly flowing film, a gathering rotor revoluble upon the axis of rotation of said dispersing rotor, said gathering rotor having curved channels leading toward its axis of rotation, means for revolving said gathering rotor in a direction opposite to the direction of revolution of said dispersing motor, means whereby a circular margin of such film of material is transferred into the outer ends of said curved channels, and means for conducting such material out of said curved channels.

5. A machine for treating pumpable materials comprising, in combination, a dispersing rotor having a conical inner surface generated about the axis of rotation of said dispersing rotor, means for delivering such a material to said conical inner surface adjacent said axis, a buttering element having a circular knife edge concentric with said axis for spreading such material upon said conical inner surface, there being a narrow circular crack between said circular knife edge and said conical inner surface, whereby such material emerging through said narrow crack is spread upon said conical inner surface in a thin layer, means for revolving said dispersing rotor rapidly about its axis, whereby said material is formed by a centrifugal action into an outwardly flowing film, a gathering rotor revoluble upon the axis of rotation of said dispersing rotor, said gathering rotor having curved channels leading toward its axis of rotation, means for revolving said gathering rotor in a direction opposite to the direction of revolution of said dispersing rotor, means whereby a circular margin of such film of material is transferred into the outer ends of said curved channels, the last said means including a surface of said gathering rotor turning in close proximity to the circular margin of such film and having orifices opening into said channels, and means for conducting such material out of said curved channels.

6. A machine for treating pumpable materials comprising, in combination, a dispersing rotor having a conical inner surface generated about the axis of rotation of said dispersing rotor, means for delivering such a material to said conical inner surface adjacent said axis, a buttering element having a circular knife edge concentric with said axis for spreading such material upon said conical inner surface, there being a narrow circular crack between said circular knife edge and said conical inner surface, whereby such material emerging through said narrow crack is spread upon said conical inner surface in a thin layer, means for revolving said dispersing rotor rapidly about its axis, whereby said material is formed by a contrifugal action into an outwardly flowing film, a gathering rotor revoluble upon the axis of rotation of said dispersing rotor, said gathering rotor having channels leading toward its axis of rotation, means for revolving said gathering rotor in a direction opposite to the direction of revolution of said dispersing rotor and means whereby a circular margin of such film of material is transferred into the outer ends of said channels, said channels being so curved as to deflect such material inwardly, and a hollow outlet shaft forming a conduit from said channels and extending axially from said gathering rotor.

7. A machine for treating pumpable materials comprising, in combination, a dispersing rotor having a conical inner surface, means for delivering such a material to said conical inner surface, a gathering rotor having channels leading toward its axis of rotation, means for turning said dispersing rotor in one direction, means for turning said gathering rotor in the opposite direction and means whereby such material is transferred from a circular margin of said conical inner surface into said channels, a hollow capsule containing said dispersing rotor and said gathering rotor, means for conducting such material out of said channels and out of said capsule and means for maintaining a partial vacuum within said capsule.

8. A machine for treating pumpable materials comprising, in combination, a dispersing rotor having a conical inner surface, means for delivering such a material to said conical inner surface, a buttering element for spreading such material upon said conical inner surface, a gathering rotor having channels leading toward its axis of rotation, means for turning said dispersing rotor in one direction, means for turning said gathering rotor in the opposite direction and means whereby said material is transferred from a circular margin of said conical inner surface into said channels, a hollow capsule containing said dispersing rotor and said gathering rotor, means for conducting such material out of said capsule and means for maintaining a partial vacuum within said capsule.

9. A machine for treating pumpable materials comprising, in combination, a dispersing rotor having a conical inner surface, means for delivering such a material to said conical inner surface adjacent to the axis of rotation of said rotor, a buttering element having a knife edge for spreading such material upon said conical inner surface, a gathering rotor having channels leading toward its axis of rotation, means for turning said dispersing rotor in one direction, means for turning said gathering rotor in the opposite direction and means whereby said material is transferred from a circular margin of said conical inner surface into said channels, a hollow capsule containing said dispersing rotor, means for conducting such material out of said channels and out of said capsule and means for maintaining a partial vacuum within said capsule.

10. A machine for treating pumpable materials comprising, in combination, a dispersing rotor having a conical inner surface generated about the axis of rotation of said dispersing rotor, means for delivering such a material to said conical inner surface adjacent said axis, a buttering element having a circular knife edge concentric with said axis for spreading such material upon said conical inner surface, there being a narrow circular crack between said circular knife edge and said conical inner surface, whereby such material emerging through said narrow crack is spread upon said conical inner surface in a thin layer, means for revolving said dispersing rotor rapidly about its axis, whereby said material is formed by a centrifugal action into an outwardly flowing film, a gathering rotor revoluble upon the axis of rotation of said dispersing rotor, said gathering rotor having channels leading toward its axis of rotation, means for revolving said gathering rotor in a direction opposite to the direction of revolution of said dispersing rotor and means whereby a circular margin of such film of material is transferred into the outer ends of said channels, a hollow capsule containing said dispersing rotor and said gathering rotor, means for conducting such material out of said channels and out of said capsule and means for maintaining a partial vacuum within said capsule.

References Cited in the file of this patent
UNITED STATES PATENTS

| | | |
|---|---|---|
| 2,559,516 | Russell | July 3, 1951 |
| 2,584,424 | Cornell | Feb. 5, 1952 |
| 2,667,338 | Hemfort | Jan. 26, 1954 |
| 2,673,075 | Borck | Mar. 23, 1954 |